(12) United States Patent
Conrad

(10) Patent No.: US 11,745,131 B2
(45) Date of Patent: Sep. 5, 2023

(54) FILTER ASSEMBLY

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 289 days.

(21) Appl. No.: 16/914,781

(22) Filed: Jun. 29, 2020

(65) Prior Publication Data
US 2021/0402332 A1    Dec. 30, 2021

(51) Int. Cl.
*B01D 46/12* (2022.01)
*B01D 46/10* (2006.01)
*B01D 46/52* (2006.01)
*B01D 46/00* (2022.01)

(52) U.S. Cl.
CPC ......... *B01D 46/12* (2013.01); *B01D 46/0005* (2013.01); *B01D 46/10* (2013.01); *B01D 46/523* (2013.01); *B01D 2271/02* (2013.01)

(58) Field of Classification Search
CPC .......................... B01D 46/521; B01D 46/523
See application file for complete search history.

(56) References Cited

U.S. PATENT DOCUMENTS

| | | | | |
|---|---|---|---|---|
| 2,135,863 A | * | 11/1938 | Russells | B01D 46/0002 55/529 |
| 4,617,122 A | * | 10/1986 | Kruse | B01D 46/10 210/493.3 |
| 6,740,136 B2 | * | 5/2004 | Duffy | B01D 29/031 55/497 |
| 7,258,789 B2 | * | 8/2007 | Peet | B01D 35/0273 210/493.1 |
| 8,486,170 B2 | | 7/2013 | Conrad et al. | |
| 9,492,045 B2 | | 11/2016 | Conrad | |
| 9,841,730 B2 | * | 12/2017 | Yamaguchi | B01D 46/10 |
| 10,506,904 B2 | | 12/2019 | Conrad et al. | |
| 2003/0070406 A1 | * | 4/2003 | Duffy | B01D 29/031 55/497 |
| 2003/0230062 A1 | * | 12/2003 | Kubokawa | B01D 46/0005 55/497 |
| 2003/0230063 A1 | * | 12/2003 | Kubokawa | B01D 46/10 55/497 |
| 2004/0172928 A1 | * | 9/2004 | Kubokawa | B01D 46/0005 55/497 |
| 2005/0138905 A1 | * | 6/2005 | Kubokawa | B01D 46/521 55/497 |
| 2005/0138906 A1 | * | 6/2005 | Kubokawa | B01D 46/523 55/497 |
| 2014/0230388 A1 | * | 8/2014 | Hio | B01D 29/07 210/493.1 |
| 2015/0013287 A1 | * | 1/2015 | Yamaguchi | B01D 46/0002 55/497 |
| 2019/0060812 A1 | | 2/2019 | Conrad et al. | |
| 2019/0365173 A1 | | 12/2019 | Conrad | |
| 2020/0070082 A1 | * | 3/2020 | Fry | B23B 47/34 |
| 2021/0402333 A1 | * | 12/2021 | Conrad | B01D 46/58 |

* cited by examiner

*Primary Examiner* — Robert Clemente
(74) *Attorney, Agent, or Firm* — Philip C. Mendes Da Costa; BERESKIN & PARR LLP/ S.E.N.C.R.L., s.r.l.

(57) ABSTRACT

A filter assembly has a first housing having a plurality of recesses provided therein and a second housing having a plurality of ribs provided on an inner surface thereof. When the first and second housings are in an engaged configuration, the ribs are receivable in the recesses of the first housing thereby securing a filter media in the filter assembly.

15 Claims, 12 Drawing Sheets

FILTER ASSEMBLY

FIELD

This disclosure relates generally to a filter assembly, which uses a replaceable filter media.

INTRODUCTION

The following is not an admission that anything discussed below is part of the prior art or part of the common general knowledge of a person skilled in the art.

Various types of filter assemblies are known. Typically, finer filter media, such as HEPA filter material, is provided in a filter assembly wherein the filter media is secured, such as by an adhesive or the like is used to secure filter media within the filter assembly. Accordingly, when the filter media requires replacement, the entire filter assembly is replaced.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one aspect of the filter assembly disclosed herein, which may be used by itself or with one or more other aspects disclosed herein, the filter assembly has a first housing and a second housing that are inter-engageable between an engaged configuration and a disengaged configuration. An advantage of this design is that the filter assembly may be transitioned between the engaged position and the disengaged position to form a housing that removably receives a filter media. Removable filter media may allow the first and second housings to be reused, thereby reducing the manufacturing and environmental costs of the filter assembly. Another advantage is that different filter media may be used in the same first and second housings. For example, filter media may have a usable life of 1 day, 1 week, 1 month, etc. or filter media having different pore sizes may alternately be used in the same housings. Accordingly, the filter assembly may be used in many applications. Another advantage is that the first and second housings may form a seal around the filter media without the need for an additional sealant, such as an adhesive. Removing the need for a sealant may reduce manufacturing costs and time.

In accordance with this aspect, there is provided a filter assembly comprising first and second inter-engageable housings wherein:
a) the first housing having first and second laterally extending opposed end walls and first and second longitudinally extending opposed sidewalls, each of the first and second opposed sidewalls extending between the first and second opposed end walls, each of the first and second opposed ends wall having a plurality of recesses provided therein;
b) the second housing having first and second laterally extending opposed end walls and first and second longitudinally extending opposed sidewalls, each of the first and second opposed sidewalls extending between the first and second opposed end walls, each of the first and second opposed end walls having a plurality of ribs provided on an inner surface thereof wherein, when the first and second housings are in an engaged configuration, the ribs are receivable in the recesses of the end walls of the first housing, the first opposed sidewall of the second housing abuts the first opposed sidewall of the first housing and the second opposed sidewall of the second housing abuts the second opposed sidewall of the first housing;
c) a filter media wherein, when the first and second housings are in an engaged configuration, a portion of the filter media is positioned between the ribs and the recesses of the end walls of the first housing, another portion of the filter media is positioned between the first opposed sidewall of the second housing and the first opposed sidewall of the first housing and another portion of the filter media is positioned between the second opposed sidewall of the second housing and the second opposed sidewall of the first housing.

In any embodiment, the first and second housings may be lockingly engaged when the first and second housings are in an engaged configuration.

In any embodiment, the first and second housings may be lockingly secured together by a friction fit.

In any embodiment, the first and second housings may be removeably secured together.

In any embodiment, one of the first and second housings may be made of a deformable sealing material.

In any embodiment, the second housing may be made of an elastomeric material.

In any embodiment, one of the surfaces of one of the first and second housings that abut surfaces of the other of the first and second housings may be provided with a deformable sealing material.

In any embodiment, the filter assembly may define first and second side by side chambers.

In any embodiment, air may flow in a first direction through the first chamber and air may flow in a second direction that is opposed to the first direction through the second chamber.

In any embodiment, the filter media in the first chamber may comprise a pre-motor filter and the filter media in the second chamber may comprise a post motor filter.

In any embodiment, the filter media that extends between the first and second opposed end walls of the first housing may comprise a contiguous filter member that is located in each of the first and second chambers.

In any embodiment, when the filter media is positioned between the first and second housings and the first and second housings are in an engaged configuration, the filter media may have a laterally extending filter media profile, and the second housing may further comprise an intermediate wall located between the first and second end walls and the intermediate wall may have a support surface that has a laterally extending profile that is comparable to that of the filter media profile.

In any embodiment, the filter media profile may be a corrugated profile.

In accordance with another aspect, which may be used by itself or with one or more other aspects disclosed herein, there is provided a method of installing filter media within first and second inter-engageable housings. The first and second housings have male and female inter-fitting members that form a seal in the absence of applying an adhesive. An advantage of this design is that a sealed filter housing may be formed for the filter media without the need of an additional sealant. Forming a seal without an additional sealant may decrease manufacturing costs and time.

In accordance with this aspect, there is provided a method of installing a first filter media in a filter housing comprising first and second inter-engageable housings, each of the first and second filter housings having first and second laterally extending opposed end walls and first and second longitudinally extending opposed sidewalls, the first and second housings having male and female inter-fitting members, the method comprising:

a) positioning a first filter media between the first and second filter housings with the male inter-fitting members spaced from and facing the female inter-fitting members; and, b) bringing the first and second housings together thereby inserting the male inter-fitting members into the female inter-fitting members, whereby a seal is formed in the absence of applying an adhesive between the first filter media and the housings.

In any embodiment, the first filter media may be pre-folded in a pattern that conforms with a contour pattern of the male and female inter-fitting members and the method may further comprise aligning the pre-folded pattern of the first filter media with the male and female inter-fitting members.

In any embodiment, the method may further comprise separating the first and second housings from an engaged configuration to a disengaged configuration, removing the first filter media, positioning a second filter media between the first and second filter housings with the male inter-fitting members spaced from and facing the female inter-fitting members and, bringing the first and second housings together thereby inserting the male inter-fitting members into the female inter-fitting members.

In accordance with another aspect, which may be used by itself or with one or more other aspects disclosed herein, there is provided a method of packaging a plurality of filter media by pre-folding the filter media. The folded filter media may be individually sealed. An advantage of pre-folding the filter media is that when the filter media is removed from the package by a user, the user may use the filter media without having to fold the filter media into a profile to match the filter housings, thereby reducing the likelihood of the user damaging the filter media. Individually wrapping the filter media enables a user to remove a filter for use while other individually wrapped filter media remaining in a container remain in a sealed environment. The profile of the filter media may be designed such that each filter media is compressible within the packaging. An advantage of this design is that the profile may save space within the package and may prevent damage to the filter media.

In accordance with this aspect, there is provided a method of packaging a plurality of filter media comprising:

a) pre-folding a plurality of the filter media whereby formed filter media having a profile is provided;

b) placing one of the formed filter media in a sealed enclosure whereby an individually sealed formed filter media is provided; and, c) positioning a plurality of the individually sealed formed filter media in a container.

In any embodiment, the profile may be a corrugated profile, the formed filter media may have a top having a plurality of valleys, a bottom may have a plurality of valleys and first and second opposed sides and the method may further comprise placing the plurality of individually sealed formed filter media in the container in a side by side arrangement.

In any embodiment, the plurality of individually sealed formed filter media may be placed in the container with a side of one individually sealed formed filter media adjacent a side of another individually sealed formed filter media.

In any embodiment, prior to being folded, the filter media may be a planar filter media.

In any embodiment, the filter media may be a HEPA filter media.

In accordance with another aspect, which may be used by itself or with one or more other aspects disclosed herein, filter media is nested and packaged as a nested package. An advantage of this design is that the nested package may be less susceptible to damage due to the increased bulk. The profile of the filter media may be shaped such that the nested packages are compressible to save space within the packaging container.

In accordance with this aspect, there is provided a method of packaging a filter media comprising:

a) pre-folding the filter media whereby a formed filter media having a profile is provided;

b) nesting a plurality of the formed filter media; and, c) placing the plurality of the formed filter media in a nested configuration in a sealed enclosure whereby a nested package of formed filter media is obtained.

In any embodiment, the method may further comprise placing a plurality of the nested package of formed filter media in the container in a side by side arrangement.

In any embodiment, the profile may be a corrugated profile, the formed filter media may have a top having a plurality of valleys, a bottom may have a plurality of valleys and first and second opposed sides, the nested package may have a first side adjacent the first opposed sides, the nested package may have a second side adjacent the second opposed sides and the method may further comprise placing the plurality of nested packages in the container with the first opposed side of one nested package adjacent one of the first and second sides of a second nested package.

In any embodiment, prior to being folded, the filter media may be a planar filter media.

In any embodiment, the filter media may be a HEPA filter media.

In any embodiment, the nested package may be resealable.

In accordance with another aspect, which may be used by itself or with one or more other aspects disclosed herein, the filter media is pre-folded and then unfolded for packaging. An advantage of this design is that fold lines are created for the user to re-fold the filter media when removing it from the package, thereby reducing the likelihood that the user will damage the filter media when refolding the filter media for insertion into the filter housings. Additionally, packaging unfolded filter media may save space and reduce the likelihood of the filter media being damaged.

In accordance with this aspect, there is provided a method of packaging a filter media comprising:

a) pre-folding the filter media whereby a formed filter media having fold lines is provided;

b) unfolding the formed filter media; and, c) placing the plurality of the unfolded formed filter media in a sealed enclosure.

In any embodiment, prior to being folded, the filter media may be a planar filter media.

In any embodiment, the filter media may be a HEPA filter media.

In any embodiment, the sealed enclosure may be resealable.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
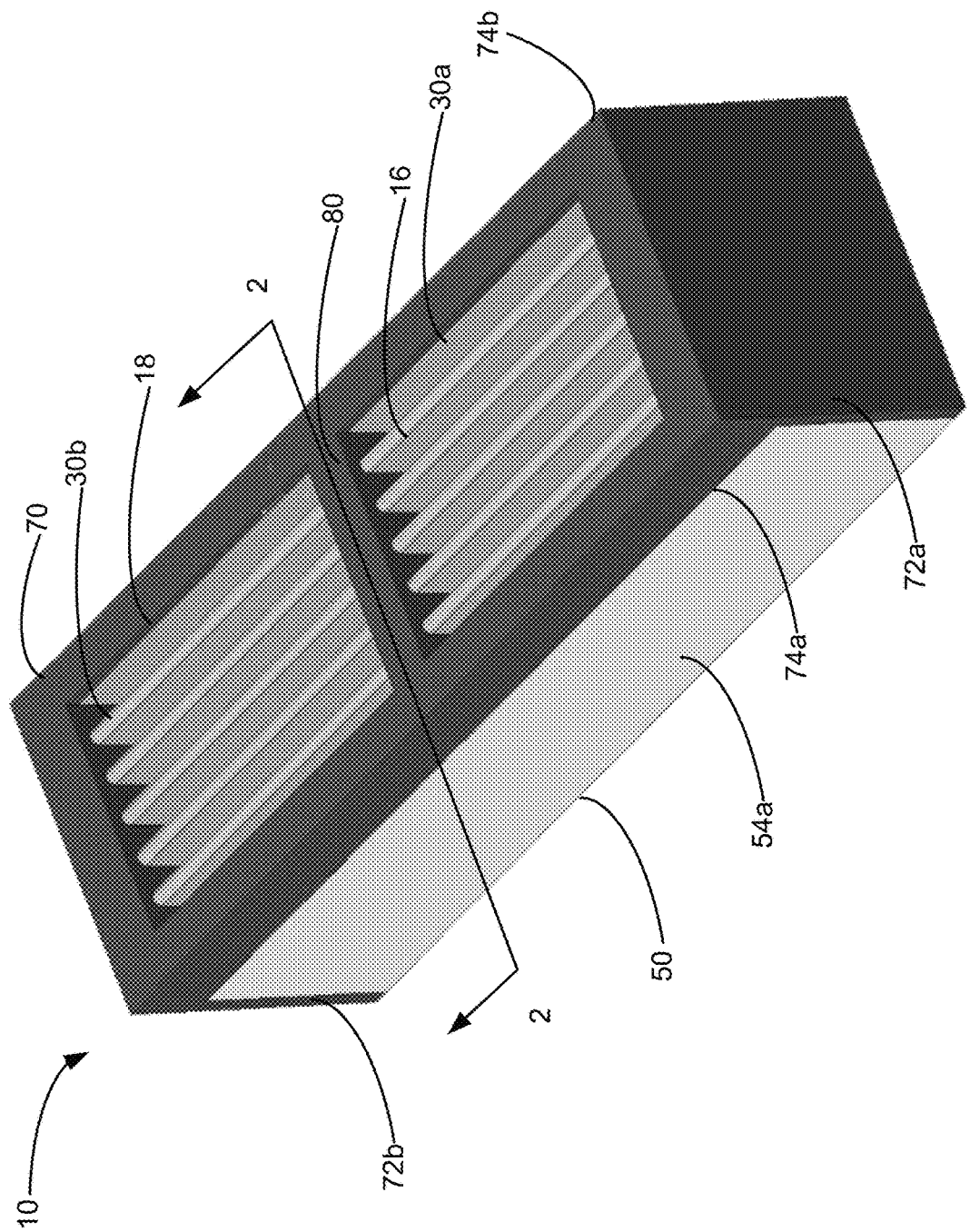
FIG. 1 is a front perspective view of an exemplary embodiment of a filter assembly.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

General Description of a Filter Assembly

FIG. 1 exemplifies a filter assembly 10. The filter assembly 10 includes a filter media 30, a first housing 50, and a second housing 70. The filter assembly 10 has a first port 12 and a second port 14 for allowing air to pass through the filter assembly 10. The filter assembly 10, which can also be referred to as a filter cartridge, may be removably receivable in a filter housing of an appliance.

Figure 2:
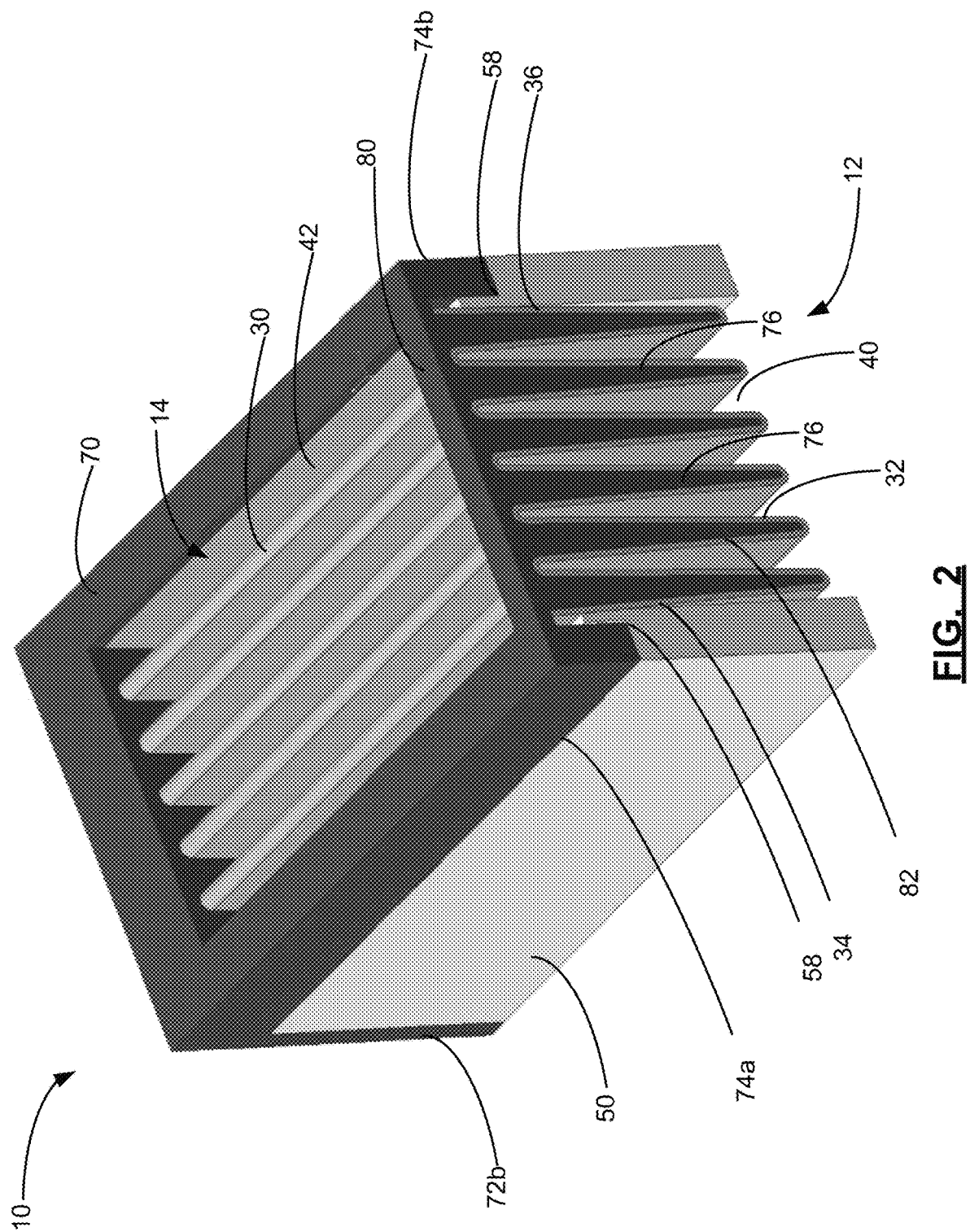
FIG. 2 is a sectional view of the filter assembly of FIG. 1 along the line 2-2 in FIG. 1.
Figure 3:
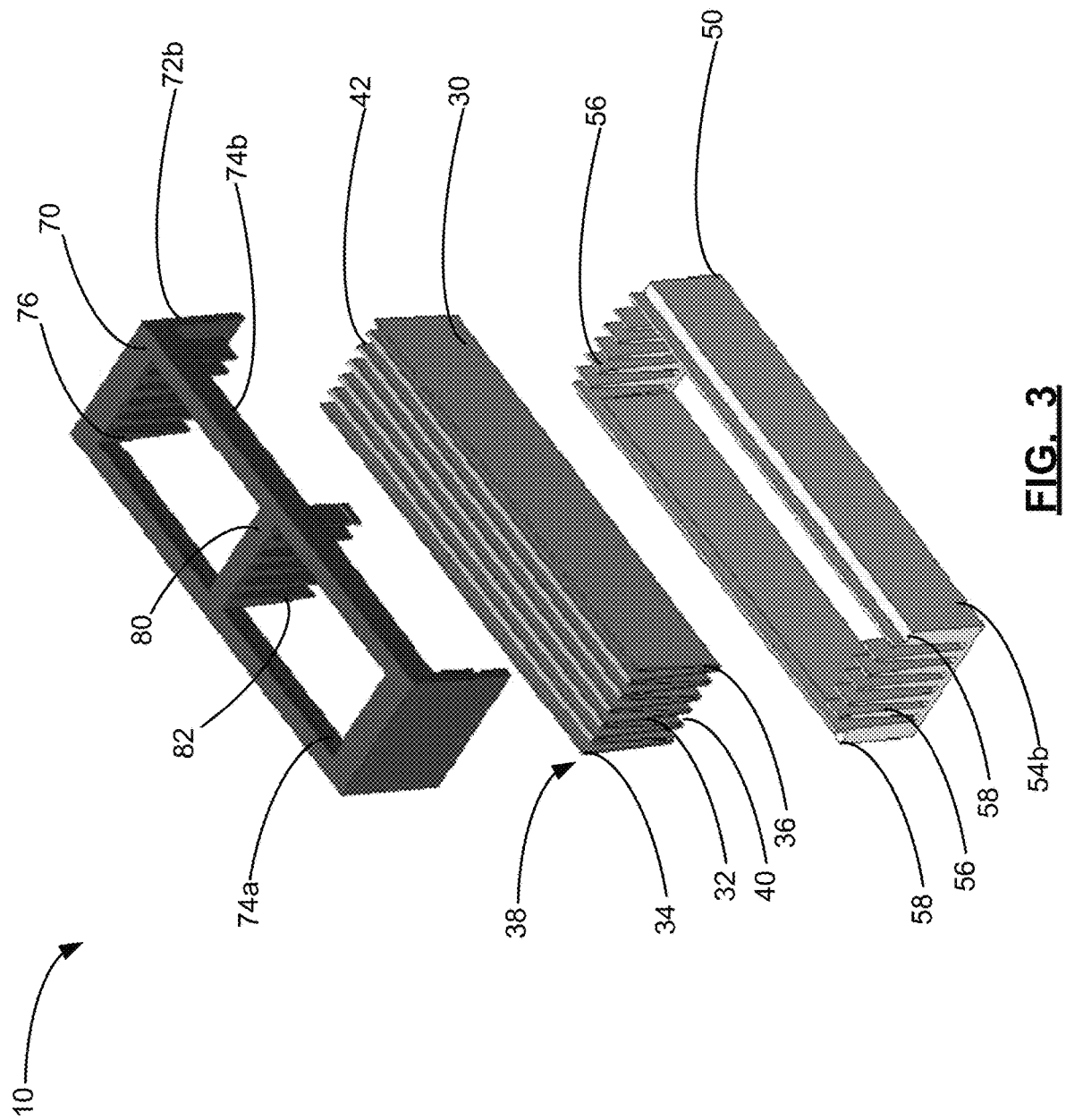
FIG. 3 is a top perspective exploded view of the filter assembly of FIG. 1.
Figure 4:
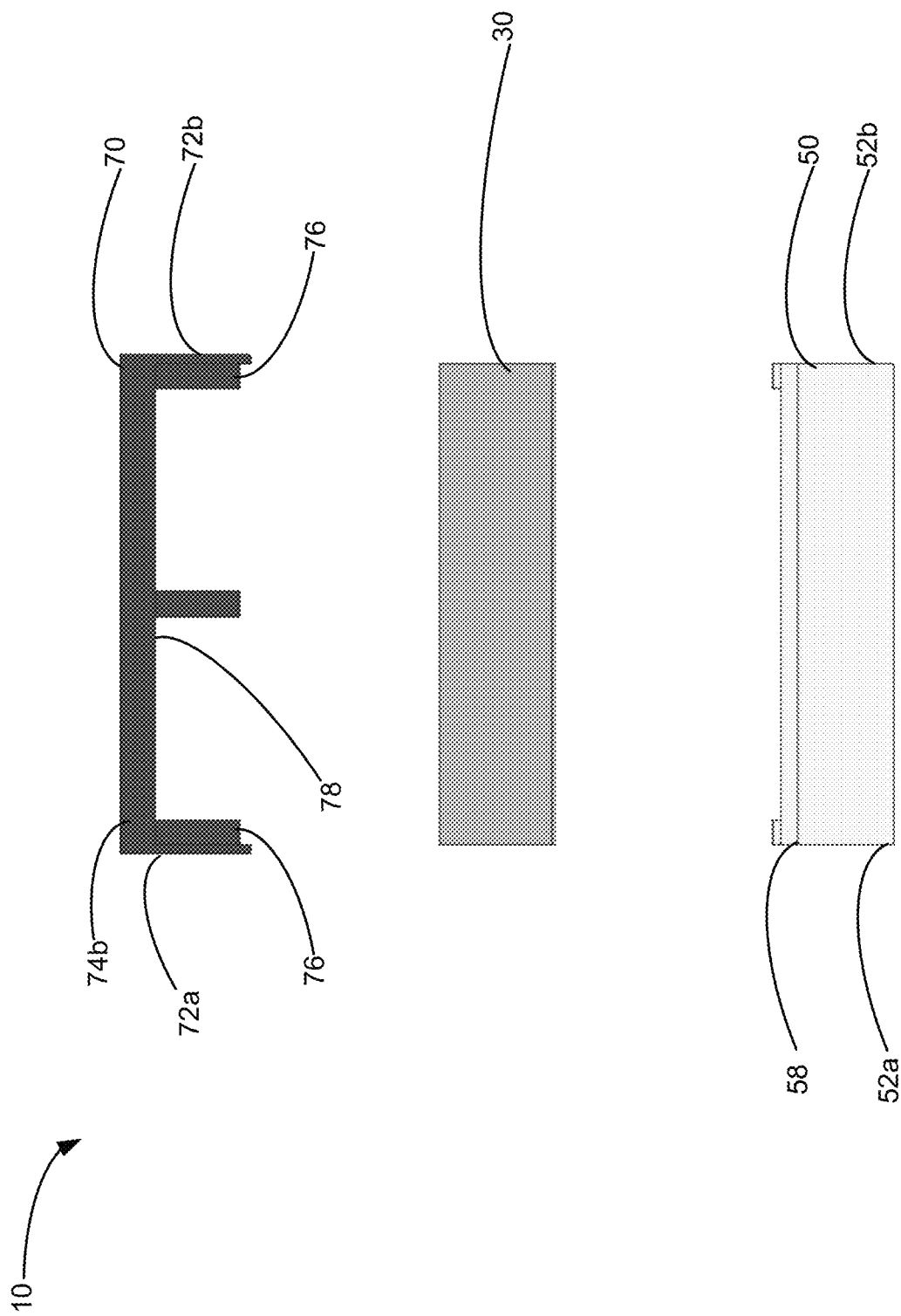
FIG. 4 is a side exploded view of the filter assembly of FIG. 1.
Figure 5:
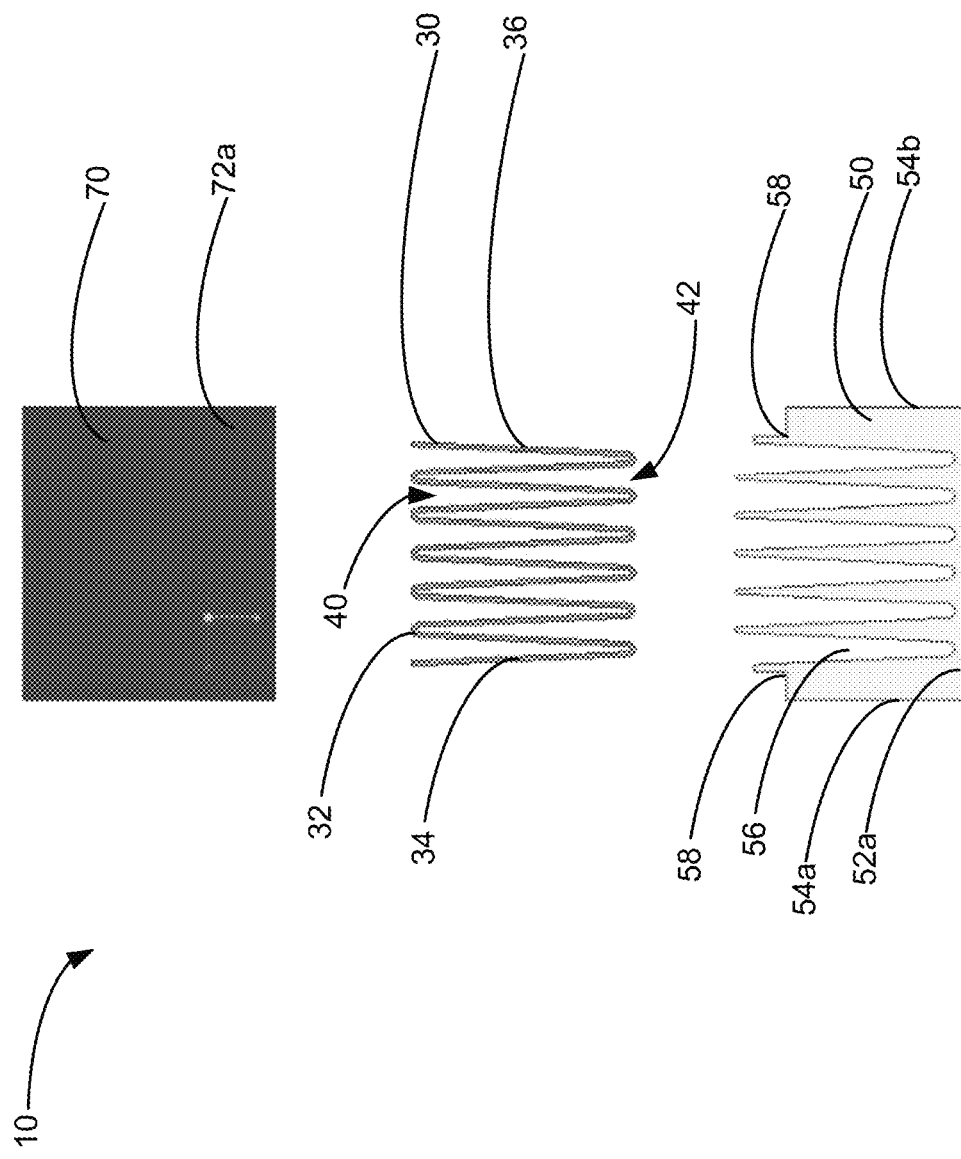
FIG. 5 is a front exploded view of the filter assembly of FIG. 1.

The first housing 50 and the second housing 70 are inter-engageable between an engaged configuration, as exemplified in FIGS. 1-2, and a disengaged configuration, as exemplified in FIGS. 3-5. When the first and second housings 50, 70 are in the disengaged configuration, the filter media 30 may be removably positioned between the housings 50, 70. When in the engaged configuration, the first and second housings 50, 70 together form a housing for the filter media 30, thereby securing the filter media 30 in place within the filter assembly 10.

As exemplified in FIGS. 1-5, the first housing 50 has first and second laterally extending opposed end walls 52a, 52b respectively, also referred to as first end walls 52. The first housing 50 has first and second longitudinally extending opposed sidewalls 54a, 54b respectively, also referred to as first sidewalls 54. As exemplified, the first sidewalls 54 extend between the first end walls 52.

As exemplified in FIGS. 1-5, the second housing 70 has first and second laterally extending opposed end walls 72a, 72b respectively, also referred to as second end walls 72. The second housing 70 has first and second longitudinally extending opposed sidewalls 74a, 74b respectively, also referred to as second sidewalls 74. As exemplified, the second sidewalls 74 extend between the second end walls 72.

It will be appreciated that while each of housings 50 and 70 are exemplified as being rectangular, the housings, and the filter assembly 10, may be of any other shape.

Removable Filter

In accordance with this aspect, which may be used by itself or in combination with one or more other aspects, the filter media 30 may be removable from the filter assembly 10. For example, the inter-engageable housings 50, 70 allow for the filter media 30 to be removed from the filter assembly 10. The use of a removable filter media 30 allows the housings 50, 70 to be used more than once. When the filter media 30 reaches the end of its usable life, the filter media 30 may be replaced by another filter media 30. One advantage of this design is a reduction in environmental damage since the housings 50, 70 can be reused. Additionally, the reuse of the housings 50, 70 may reduce manufacturing costs, since the housings 50, 70 are not disposed of after a single filter media 30 use.

Another advantage is that the filter media 30 may be removed from the housings 50, 70 to allow the housings 50, 70 to be cleaned and/or disinfected.

Another advantage is that the filter assembly 10 may be used for different filter media 30. For example, filter media 30 having differing levels of filtration may be provided, each of which is receivable by the same filter assembly 10.

Alternately, or in addition, filter media 30 having differing life spans of the filter material may be provided, each of which is receivable to the same filter assembly 10. For example, a filter media useable for, e.g., 1 day, 1 week, 1 month, etc. may be provided. The filter assembly 10 may be used for a short period of time and therefore, less filter material may be used. Another filter assembly 10 may be useable for a longer period of time (e.g., a week, two weeks, a month or longer).

It will be appreciated that the filter media 30 may be any one or more filter media capable of filtering air. For example, the filter media 30 may be any porous filter media. The filter media may be any filter media that is capable of being folded and retaining a fold line. Accordingly, the filter media may be a non-resilient filter media. In addition, the filter media may be relatively thin, e.g., the filter material may be a sheet, such as the thickness of HEPA filter material.

Optionally, the filter media comprises at least one layer of filter media that is selected to prevent or limit the flow therethrough of biological material. Accordingly, it may have pore sizes that inhibit or prevent the flow therethrough of bacteria and/or viruses. Examples of suitable filter material include HEPA, ULPA, MERV 15, MERV 16, MERV17 or higher filter materials. Optionally, the filter media may be a pleated filter media.

Optionally, according to this aspect, one or more other filter media may be provided on one or both sides of the filter media 30. Providing more porous filter media on the upstream and/or downstream side of the filter media 30 may extend the life span of the biological filter media. Optionally, such more porous filter media may be provided on each side of the filter media 30.

For example, in some embodiments, the more porous filter media may be a foam filter and/or a felt filter. The foam and felt filters may protect the filter media 30 by capturing larger debris and, thereby increasing the lifetime of the filter media 30.

Filter Assembly Construction

In accordance with this aspect, which may be used by itself or in combination with one or more other aspects, the filter assembly 10 may be openable to replace one or more filter media 30 provided therein or may have one or more filter layers insertable between filter housings 50, 70.

Accordingly, as described previously, the filter housings 50, 70 are inter-engageable to form the housing for the filter media 30. In some embodiments, the filter housings 50, 70 may be removably inter-engageable. It will be appreciated that the housings 50, 70 may be inter-engageable in any way that secures the filter media 30 within the filter assembly 10 and which seals the filter media in position such that air entering the filter assembly must pass through the filter media 30 and cannot by-pass, or is inhibited from by-passing, the filter media by travelling between the filter media and a wall of the filter assembly. Therefore, the housings 50, 70 may have co-operating walls that abut or engage to secure the filter media in position and prevent by-pass of the filter media 30.

The housings 50, 70 may be secured together in any way known in the filter arts. For example, one or both of the filter housings 50, 70 by may be compressible (e.g., made of a resilient material) such that the housings 50, 70 may be secured in position by compression. Alternately, the filter housings 50, 70 may be held in position by a friction fit. Alternately, or in addition, a mechanical locking member may be provided secures the housings 50, 70 in a closed, locked configuration. For example, filter assembly 10 may have a mechanical lock with first and second mateable elements on each of the first and second housings 50, 70. When in the engaged configuration, the first and second mateable elements may be mated to secure the first housing 50 to the second housing 70.

As exemplified in FIGS. 1-5, the housings 50, 70 may have walls that inter-engageable and/or abut. As exemplified, each of the first and second opposed end walls 52 of the first housing 50 has a plurality of recesses 56 provided therein, while each of the first and second opposed end walls 72 has a plurality of ribs 76 provided on an inner surface 78. The ribs 76 may also be referred to as male inter-fitting members 76. When the first and second housings 50, 70 are in the engaged or closed configuration, the ribs 76 may be receivable in the plurality of recesses 56 of the first housing 50. The recesses 56 may also be referred to as female inter-fitting members 56. It will be appreciated that any number of recesses 56 may be provided and the recesses may be of any configuration. As exemplified, the recesses extend generally the entire height of walls 52, thereby increasing the amount of filter media that may be retained in the housings 50, 70.

Additionally, in the closed configuration, the first opposed sidewall 74a of the second housing abuts the first opposed sidewall 54a of the first housing 50 and the second opposed sidewall 74b of the second housing 70 abuts the second opposed sidewall 54b of the first housing 50. As exemplified in FIG. 2, each sidewall 54 has a seat 58 for receiving each respective sidewall 74 of the second housing 70. In other words, the ribs 76 of second housing 70 may be positioned within the recesses 56 of the first housing 50, while the sidewalls 74 of the second housing 70 may be positioned on the seats 58 of the first housing 50.

As exemplified in FIGS. 1-2, when the first and second housings 50, 70 are in the engaged configuration, a first portion 32 of the filter media 30 is positioned between the ribs 76 and the recesses 56, a second portion 34 of the filter media 30 is positioned between the first sidewall 74a of the second housing 70 and the first sidewall 54a of the first housing 50, and third portion 36 is positioned between the second sidewall 54b of the second housing 70 and the second sidewall 54b of the first housing 50. As exemplified in FIGS. 1-5, the ribs 76 may form a friction fit with the recesses 56 and the sidewalls 74 form a friction fit with the seats 58. The positioning of each portion 32, 34, and 36 of the filter media 30 allows the filter media 30 to be secured in place within the filter assembly 10 and seals the filter media 30 within the housings 50, 70 such that air entering the filter assembly will pass through the filter media and is inhibited from by-passing the filter media.

Filter Assembly Seal

In accordance with this aspect, which may be used by itself or in combination with one or more other aspects, the inter-engageability of the first and second housings 50, 70 may form a seal in the filter assembly 10. An advantage of this design is that an additional sealant is not needed to provide an air-tight seal for the filter assembly 10. Using the inter-engageability of the housings 50, 70 to form a seal may improve the speed and reduce the cost of manufacturing the filter assembly 10. Forming a seal between the first and second housings 50, 70 may also improve the efficiency of the filter assembly 10 by preventing or inhibiting air leakage from the filter assembly 10. Accordingly, air must travel through the filter media 30 without escaping the filter assembly 10 through the sidewalls or end walls.

It will be appreciated that the seal of the filter assembly 10 may be formed by any means. Optionally, a sealing member (such as a gasket) may be provided on one of the inter-engageable members or one of the inter-enagaeable members may be deformable. Accordingly, in the engaged configuration, the sealing member or the deformable housing may be such that the inter-engageability of the housings 50, 70 acts as a seal for the filter assembly 10.

In some embodiments, one of the first and second housings 50, 70 may be made of a deformable sealing material. For example, the second housing 70 may be made of a deformable sealing material while the first housing 50 may be made of a more rigid material. When in the engaged configuration, the first housing 50 may apply a pressure to the deformable second housing 70 such that a seal is formed between the two housings 50, 70. Making the second housing 70 out of a deformable material may improve the seal of the filter assembly 10 by allowing the second housing 70 to deform to fill in any gaps between the first and second housings 50, 70. For example, in some embodiments, the second housing 70 may be made of an elastomeric material. Accordingly, the second housing 70 itself may form the deformable seal of the filter assembly 10.

Alternately, a portion of one of the first and second housings 50, 70 may be made of a deformable sealing material. For example, in some embodiments, the ribs 76 of the second housing 70 may be formed of a deformable sealing material while the rest of the second housing 70 may be formed of a rigid material. When the ribs 76 are received in the recesses 56 in the engaged configuration, the ribs 76 may deform to fill any gaps between the first and second housings 50, 70.

Alternately or in addition, a surface of one of the first and second housings 50, 70 may be made of, or may include, a deformable sealing material. In other words, the surface of one of the housings 50, 70 that abuts a surface of the other of the housings 50, 70 may be provided with a deformable sealing material. It will be appreciated that either of the first or second housings 50, 70 may include one or more surfaces with deformable sealing materials thereon. For example, a surface of the ribs 76 of the second housing 70 may include a deformable sealing material thereon. When in the engaged configuration, the deformable surface of the ribs 76 may deform to fill the recesses 56 of the first housing 50, thereby improving the seal of the filter assembly 10. The deformable sealing material may include, but is not limited to, a coating, a gasket, a sealing ring, or any other sealing material.

Filter Media Profile

In accordance with this aspect, which may be used by itself or in combination with one or more other aspects, when the filter media 30 is positioned within the housings 50, 70, and the housings are in the engaged configuration, air flow through the filter media 30 may be limited by the profile of the filter media 30. For example, in some embodiments, the filter media 30 may have a laterally extending filter media profile 38, also referred to as the filter media profile 38 and/or the contour pattern 38.

Accordingly, in some embodiments, as exemplified in FIGS. 1-5, 8, 10, and 12, the filter media profile 38 may be folded to have a corrugated profile. The corrugated profile 38 is comparable to the profile formed between the ribs 76 and the recesses 56, thereby allowing the filter media 30 to be positioned between the first and second housings 50, 70.

As exemplified in FIG. 1, the upper or upstream side of chamber 16 may be fully open or may have a upper surface having a port therein. Similarly, the lower or downstream side of chamber 16 may be fully open or may have a lower surface having a port. If a port is provided, e.g., in the upper side of channel 16, then the profile of the filter media may provide channels that function as a header to enable air that has passed through the filter media to travel laterally through the channels to the outlet port. For example, as exemplified in FIGS. 1-5, the corrugated profile 38 may create a plurality of first headers 40 and second headers 42 within the filter media 30. The first headers 40 may also be referred to as bottom valleys 40 while the second headers 42 may be referred to as top valleys 42. The first headers 40 are formed on the bottom of the filter media 30 on the side of the first port 12 and the second headers 42 are formed on the top of the filter media 30 on the side of the second port 14. As exemplified, the first and second headers 40, 42 are the inverse of each other due to the corrugated profile 38. Due to the seal formed by the first and second housings 50, 70, when air enters through the first port 12, the air may move along the first headers 40 before exiting the second port 14. Similarly, when air enters through the second port 14, the air may move along the second headers 42 before exiting the first port 12.

Filter Assembly Zones

In accordance with this aspect, which may be used by itself or in combination with one or more other aspects, the filter assembly 10 may define one or more side-by-side chambers. In other words, the filter assembly 10 may be separated into chambers along the longitudinal and/or length of the filter assembly 10. An advantage of this design is that a plurality of air flow directions may be used in the filter assembly 10.

As exemplified in FIG. 3, a single contiguous filter media may extend between the opposed walls 72a, 72b. Therefore, the filter assembly may provide a filter having a single side. Air may pass in a single direction through the filter assembly when the filter assembly is positioned in an appliance. Alternately, if the appliance uses a single conduit for inflow and outflow of air, then air may pass in a single direction through the filter assembly as air enters the appliance and air may then pass in a single opposed direction as air exits the appliance.

Alternately, in accordance with this aspect, the filter assembly may be divided into two or more zones. Accordingly, for example, air may pass in a single direction through one zone of the filter assembly as air enters the appliance and air may then pass in a single opposed direction through a second zone as air exits the appliance. In such a case, each zone may be provided with its own filter media (and the filter media of the zones may be the same of different) or the zones may use the same contiguous filter media such that a single filter media is installed in the housings 50, 70

Accordingly, in some embodiments, as exemplified in FIGS. 1-5, the filter assembly may have a first chamber 16 and a second chamber 18. The first and second chambers 16, 18 may allow the filter assembly 10 to accommodate multiple air flow directions. For example, air may flow in a first direction through the first chamber 16 (e.g., upwardly in the orientation of FIG. 1) and air may flow in a second direction, opposed to the first direction, through the second chamber 18 (e.g., downwardly in the orientation of FIG. 1). In other words, the chambers 16, 18 may allow the filter assembly 10 to be used in appliances and/or applications that have multiple air flows, filtering the air on its way into the appliance and on its way out of the appliance. For example, in some embodiments, the filter assembly 10 may be used with a motor (not shown). Accordingly, the first chamber 16 may contain a pre-motor filter 30a and the second chamber 18 may include a post-motor filter 30b. It will be appreciated that the pre-motor filter 30a and the post-motor filter 30b may be the same filter media 30 or may be distinct filter media 30.

In some embodiments, one or both of the housings 50, 70 may include an intermediate wall for separating the filter assembly 10 into a plurality of chambers. As exemplified, the first and second chambers 16, 18 are positioned side-by-side longitudinally within the filter assembly 10 and are separated by an intermediate wall 80 of the second housing 70. The intermediate wall 80 extends between the sidewalls 74 to create the chambers 16, 18. As exemplified in FIG. 2, the intermediate wall 80 includes a support surface 82 for supporting the filter media 30. As shown, the support surface 82 has a laterally extending profile that is comparable to the profile 38 of the filter media 30. Accordingly, when in the engaged configuration, the support surface 82 may support the filter media 30 to secure the filter media 30 in place within the filter assembly 10.

In some embodiments, the first housing 50 may have an intermediate wall with a support surface (not shown). In some embodiments, the first housing intermediate wall may have a support surface with a laterally extending profile complimentary to the profile 38 of the filter media 30 and/or to the support surface 82 of the intermediate wall 80 of the second housing 70. Accordingly, the filter media 30 may be positioned between the first housing intermediate wall and the second housing intermediate wall 80 to support and secure the filter media 30 in place.

It will be appreciated that the plurality of chambers within the filter assembly 10 may include one or more filter media 30. For example, as exemplified in FIGS. 1-5, the intermediate wall 80 separates the filter assembly 10 into first and second chambers 16, 18 with a single contiguous filter media 30. The filter media 30 extends between the first and second opposed end walls 52 contiguously. Accordingly, the same filter media 30 is located in each of the first and second chambers 16, 18. In some embodiments, the filter assembly 10 may include a plurality of filter media 30. Each filter media 30 may be positioned within its own chamber. For example, as described above, the first chamber 16 may include a pre-motor filter media 30a while the second chamber 18 may include a post-motor filter media 30b. The pre-motor and post-motor filters 30 may be a contiguous single filter media 30 that extends past the intermediate wall 80, or they may be separate filter media 30.

Fan Assist

In accordance with this aspect, which may be used by itself or in combination with one or more other aspects, a fan may be used with the filter assembly 10 to assist with directing or drawing air flow through the filter assembly 10.

For example, in some embodiments, the filter assembly 10 may include a closure panel (not shown) that covers the second port 14. The closure panel may have a fan port upstream of the fan. During use, the fan may assist in moving air from the first port 12, through the filter media 30, and out the second port 14 by way of the fan port. It will be appreciated that, if the exit route through the second port 14 is limited, then the header 40 is beneficial as it enables air to travel laterally after passing through the filter media to the outlet port. In some embodiments, a second closure panel may be used to cover the first port 12. The second closure panel may have an inlet opening to allow air to enter the first port 12. The fan may then assist with drawing the air through the first port 12, through the header 40, and out the closure panel through the fan port.

It will be appreciated that there may be any combination of closure panels and ports to assist with directing flow through the filter assembly 10. For example, in some embodiments, the filter assembly 10 may include two fans. The first fan may be positioned to draw air through the first port 12, through the first chamber 16, and out the second port 14, while the second fan may be positioned to draw air through the second port 14, through the second chamber 18, and out the first port 12.

Installing Filter Media

In accordance with this aspect, which may be used by itself or in combination with one or more other aspects, there is provided a method 200 of installing filter media 30 in the filter assembly 10.

Figure 6:
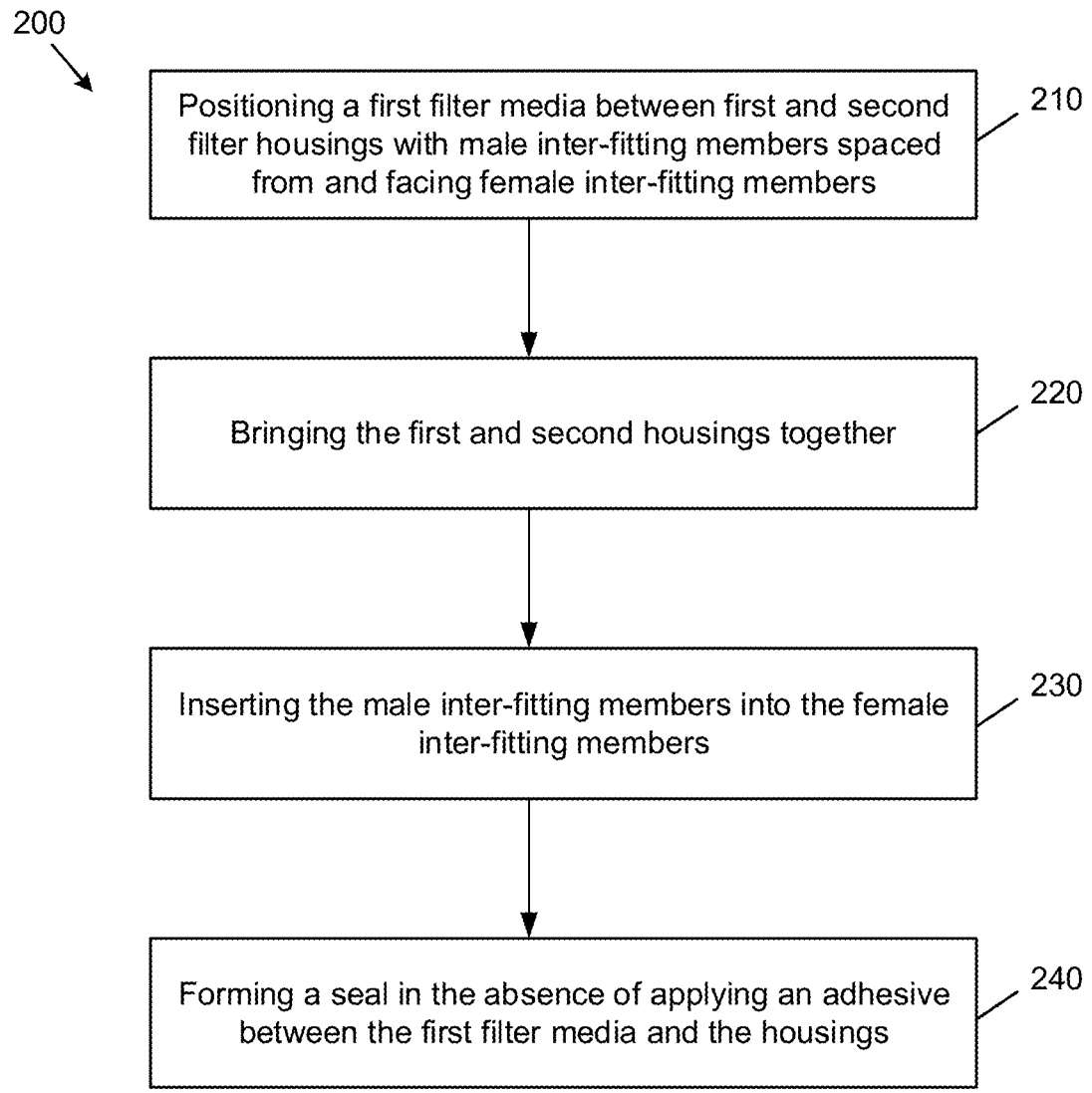
FIG. 6 is a flowchart of an exemplary method for installing filter media in a filter assembly.

As exemplified in FIG. 6, shown therein is an exemplary flow chart for installing filter media 30 in the filter assembly 10 using the method 200.

At act 210, the filter media 30 is positioned between the first and second filter housings 50, 70 with the male inter-fitting members 76 spaced from, and facing, the female inter-fitting members 56. In some embodiments, the filter media 30 may be pre-folded into a pattern with a profile 38 that conforms with the contour pattern of the male and female inter-fitting members 76, 56. Accordingly, the method 200 may include the act of aligning the pre-folded pattern 38 of the filter media 30 with the male and female inter-fitting members.

At act 220, the first and second housings 50, 70 are brought together.

At act 230, the male inter-fitting members 76 and the female inter-fitting members 56 are inter-engaged.

At act 240, a seal is formed in the absence of applying an adhesive between the filter media 30 and the housings 50, 70. The seal is formed by, e.g., the insertion of the male inter-fitting members 76 into the female inter-fitting members 76. Once act 240 is completed, the housings 50, 70 are positioned in the engaged configuration.

In some embodiments, the method 200 may include the act of separating the first and second housings 50, 70 from the engaged position to the disengaged configuration. The filter media 30 may then be removed from the housings 50, 70 and a new filter media 30 may be positioned between the first and second filter housings 50, 70. Acts 220-240 may then be repeated with the new filter media 30.

Packaging Filter Media

In accordance with this aspect, which may be used by itself or in combination with one or more other aspects, there is provided packaging methods for packaging a plurality of filter media 100.

Figure 7:
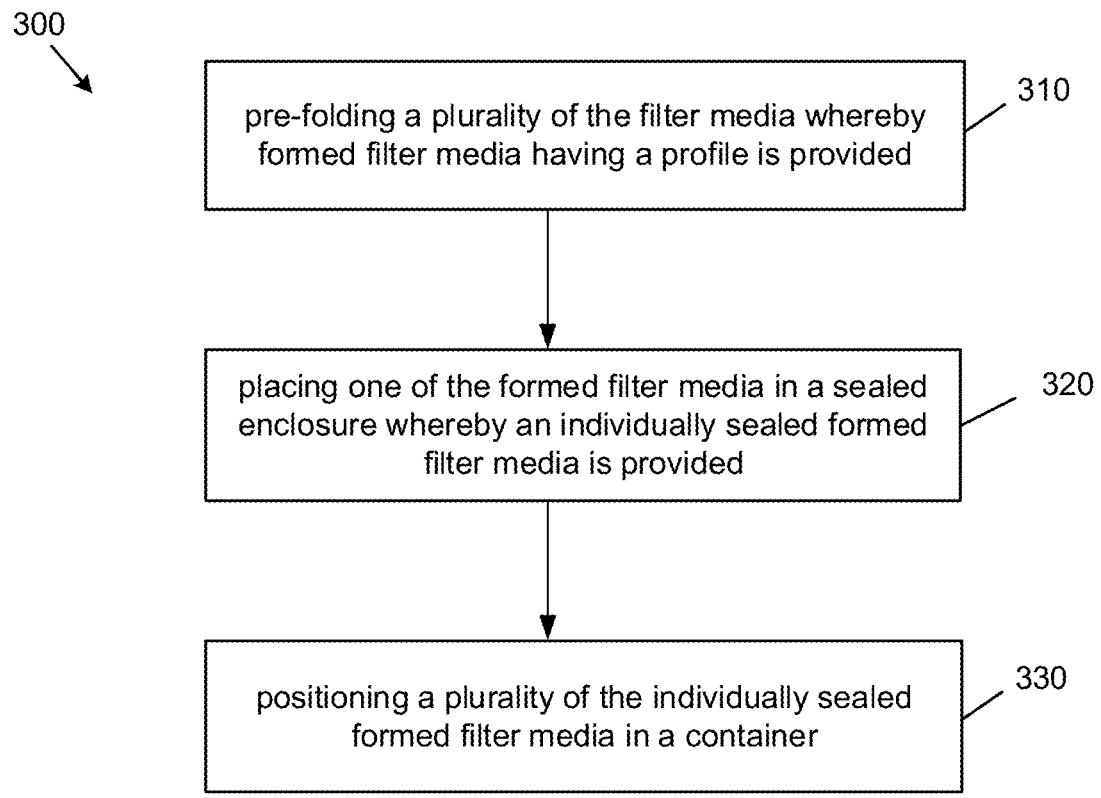
FIG. 7 is a flowchart of an exemplary method for packaging filter media.
Figure 8:
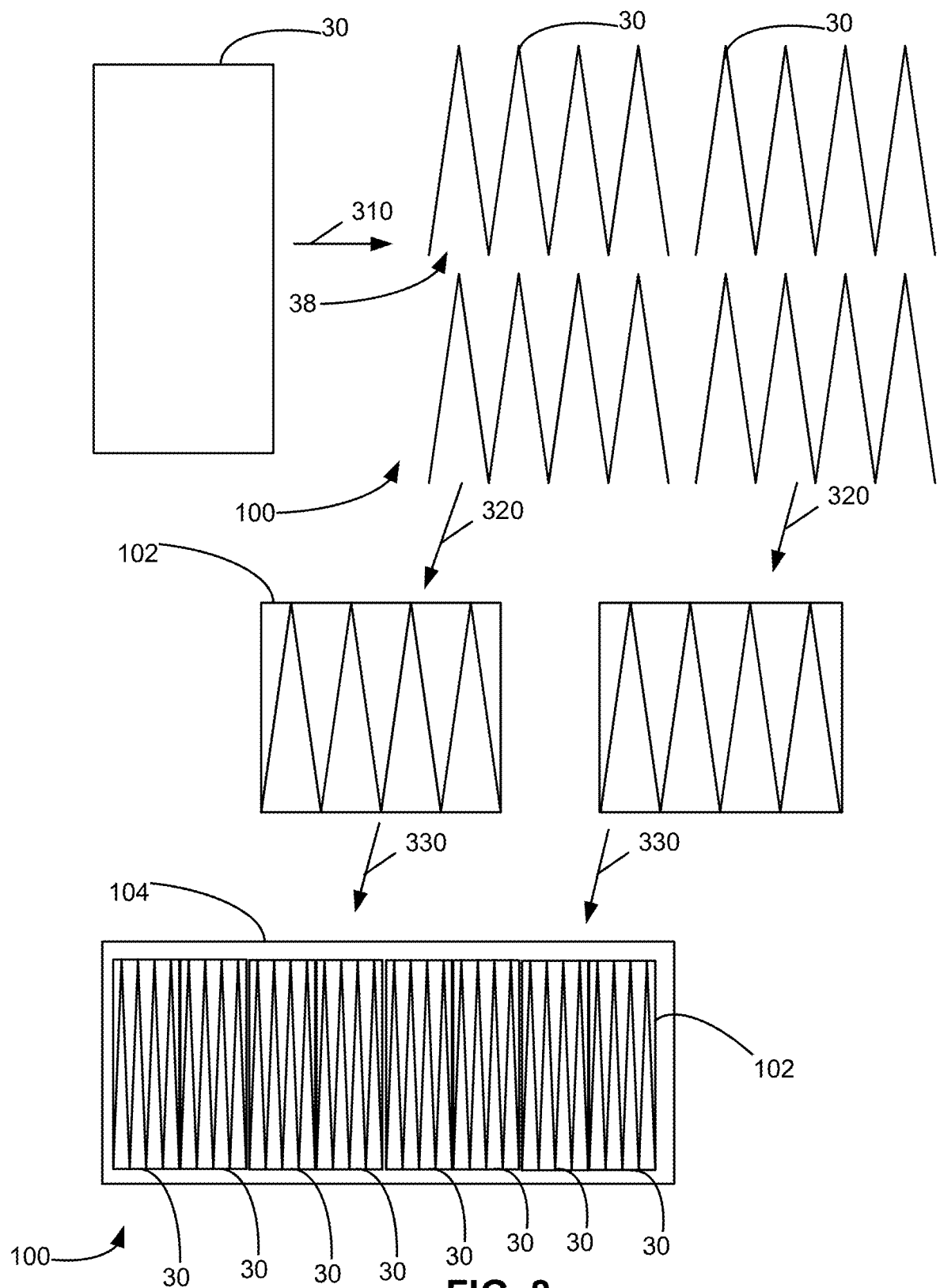
FIG. 8 is a view of a plurality of filters at various stages of packaging according to the method of FIG. 7.

In some embodiments, the filter media 30 may be individually sealed and the plurality of individually sealed filter media 100 may be packaged together, as exemplified in FIGS. 7-8. An advantage of this packaging method is that the filter media 30 may be individually protected, while being packaged together to conserve space. Individually packaging the filter media 30 may allow a user to remove a single filter media 30 for use, without exposing the remaining packaged filter media to potential contaminates. Alternately, or in addition, the profile 38 of the filter media 30 may be a corrugated profile such that the filter media 30 may be compressed to save space and prevent damage. Accordingly, the profile 38 of the filter media 30 may be designed such that the filter media 30 may be compressed for packaging and decompressed for use, without causing permanent damage to the filter media 30.

Referring to FIG. 7, shown therein is an exemplary flow chart for packaging filter media 30 using a first packaging method 300. As exemplified in FIG. 8, shown therein is a plurality of filter media 100 that illustrates the method 300.

At act 310, the plurality of filter media 100 is pre-folded forming a profile 38 for each filter media 30 in the plurality of filter media 100. As exemplified in FIG. 8, the profile 38 is a corrugated profile forming a plurality of valleys 42, 40 on the top and the bottom, respectively, of the filter media 30. In some embodiments, prior to being folded, the filter media 30 may be planar.

At act 320, each of the formed filter media 30 is placed in a sealed enclosure 102 to form an individually sealed formed filter media.

At act 330, the plurality of individually sealed formed filter media is positioned in a container 104. In some embodiments, as exemplified in FIG. 8, the individually sealed formed filter media 30 are placed side-by-side in the container 104. As described above, the profile 38 of the filter media 30 may allow the plurality of filter media 100 to be compressed to save space when in a side-by-side arrangement, without causing damage to the filter media 30.

Figure 9:
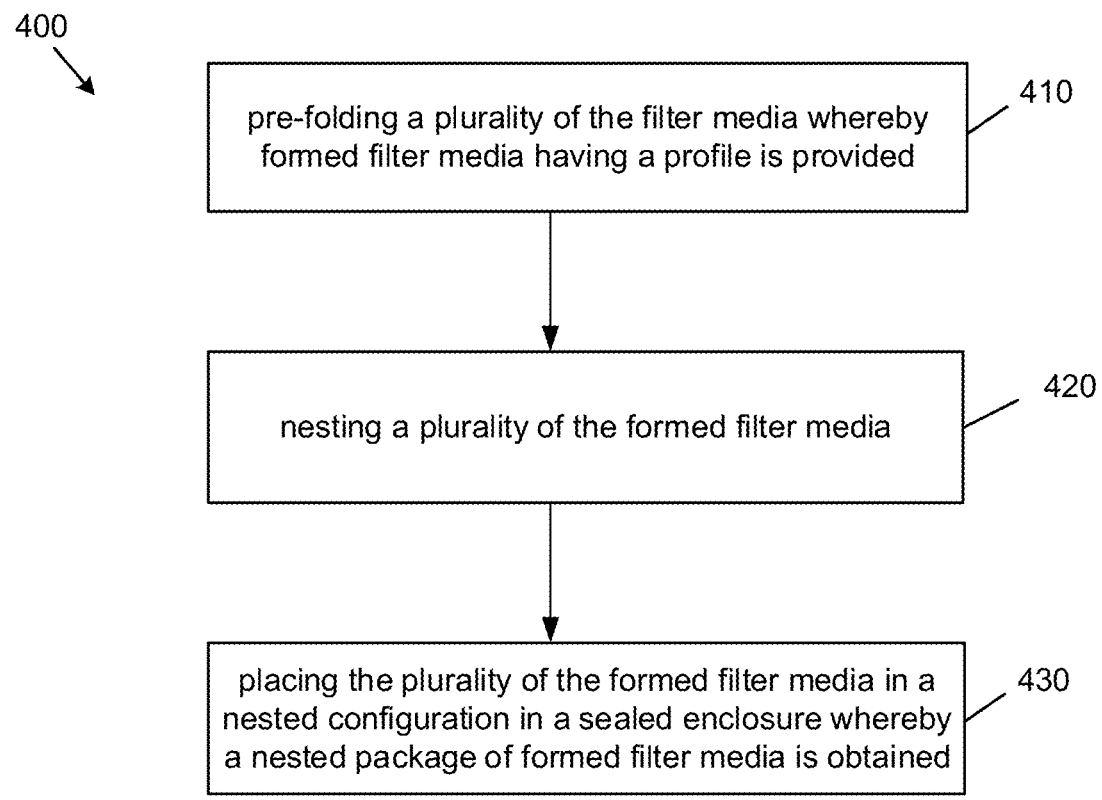
FIG. 9 is a flowchart of another exemplary method for packaging filter media.
Figure 10:
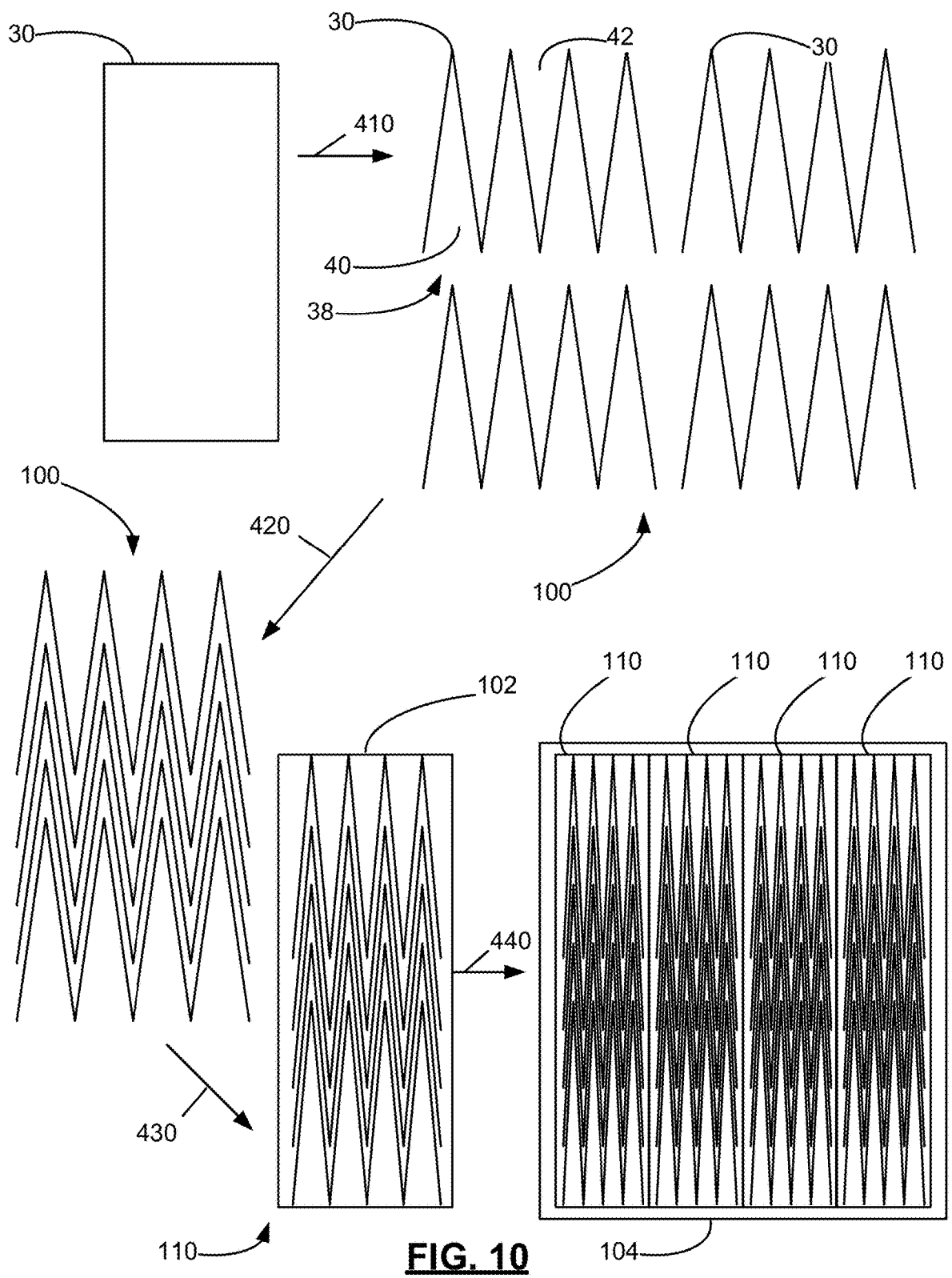
FIG. 10 is a view of a plurality of filters at various stages of packaging according to the method of FIG. 9.

In some embodiments, the plurality of filter media 30 may be nested and packaged as a nested package 110 of filter media, as exemplified in FIGS. 9-10. An advantage of this design is that packages of nested filter media may reduce manufacturing time and costs, since the individual filter media need not be sealed. In some embodiments, the filter media 30 in the nested package may have a corrugated profile, thereby allowing a plurality of nested packages 110 to be positioned side-by-side in a container. The corrugated profile may allow the nested packages to be compressed to save space.

Referring to FIG. 9, shown therein is an exemplary flow chart for packaging a plurality of filter media 100 using a second packaging method 400. As exemplified in FIG. 10, shown therein is a plurality of filter media 100 that illustrates the method 400.

At act 410, the plurality of filter media 100 is pre-folded forming a profile 38 for each filter media 30 in the plurality of filter media 100. As exemplified in FIG. 10, the profile 38 is a corrugated profile forming a plurality of valleys 42, 40, respectively, on the top and the bottom of the filter media 30. In some embodiments, prior to being folded, the filter media 30 may be planar.

At act 420, the plurality of formed filter media 100 is nested together.

At act 430, the plurality of formed filter media 100 in the nested configuration is placed in a sealed enclosure 102, thereby forming a nested package 110 of formed filter media. In some embodiments, the nested package 110 may be resealable.

In some embodiments, exemplified as act 440 in FIG. 10, a plurality of nested packages 110 is placed in a side-by-side arrangement in the container 104.

Figure 11:
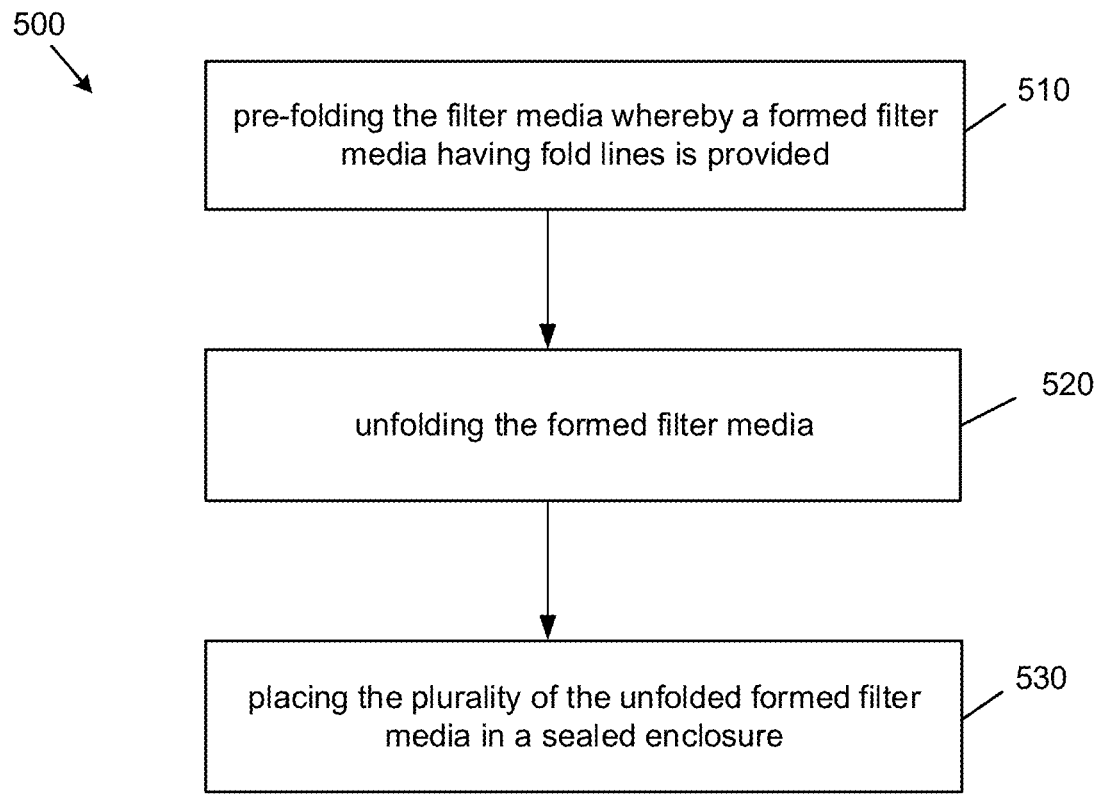
FIG. 11 is a flowchart of another exemplary method for packaging filter media; and, FIG. 12 is a view of a plurality of filters at various stages of packaging according to the method of FIG. 11.
Figure 12:
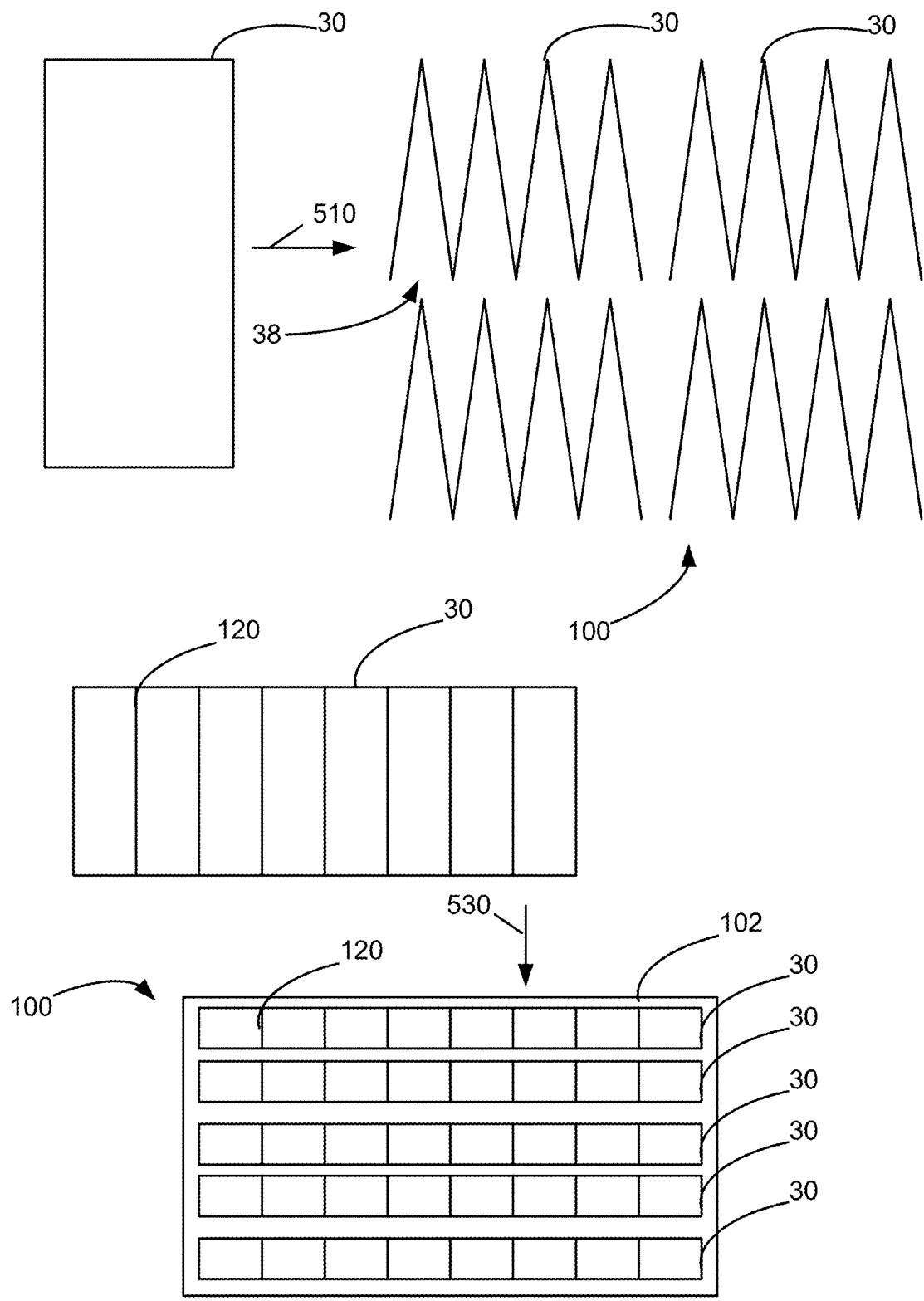

In some embodiments, the plurality of filter media 100 may be pre-folded and then unfolded for packaging, as exemplified in FIGS. 11-12, thereby creating fold lines 120 for a user to refold the filter media 30 when needed. An advantage of this design is that the unfolded filter media 30 may be more easily packaged due to its planar shape. Another advantage is that the plurality of filter media 100 may be more easily stacked to conserve space. Another advantage is that the user of the filter media 30 does not need to create their own fold lines, risking damage to the filter media 30.

Referring to FIG. 11, shown therein is an exemplary flow chart for packaging a plurality of filter media 100 using a third packaging method 500. As exemplified in FIG. 12, shown therein is a plurality of filter media 100 that illustrates the method 500.

At act 510, each filter media 30 is pre-folded, thereby forming formed filter media 30 with fold lines 120.

At act 520, each filter media 30 is unfolded.

At act 530, the plurality of unfolded formed filter media 100 is placed in a sealed enclosure 102.

Exemplary Uses

The following is a discussion of exemplary uses of the filter assembly 10 described herein. Each example utilizes various elements discussed previously. It will be appreciated that each example is exemplary and each system discussed may use additional elements disclosed previously or optionally fewer elements.

Similarly, in some embodiments, the filter assembly 10 may be used in a surface cleaning apparatus, such as a vacuum cleaner. The filter assembly 10 may be used in conjunction with a motor, as described previously. The filter assembly may be used for a pre-motor filter and/or a post-motor filter. Optionally one filter assembly 10 is used for a pre-motor filter and another filter assembly is used for a post-motor filter. Alternately, as exemplified in FIGS. 1-5, the filter assembly may be used for both the pre-motor filter and the post motor filter. Accordingly, during use, the motor may draw air through the first chamber 16 containing the pre-motor filter 30. Air then passes through the motor and is expelled through the second chamber 18 containing the post-motor filter 30, thereby cleaning the air.

Alternately, the filter assembly 10 may be used in an air cleaning system (such as a room air cleaner). As described previously with respect to surface cleaning apparatus, the filter assembly may be used for a pre-filter to treat air entering the air cleaner system and/or a post-filter to treat air exiting the air cleaning system. Optionally one filter assembly 10 is used for a pre-filter and another filter assembly is used for a post-filter. Alternately, as exemplified in FIGS. 1-5, the filter assembly may be used for both the pre-filter and the post-filter. Accordingly, during use, the air cleaning system may draw air through the first port 12, through the filter media 30 within the first chamber 16, and out the second port 14. Once the air cleaning system uses the air that has passed through the filter, the air cleaning system may pass the air through the second port 14, through the filter media 30 within the second chamber 18, and out the first port 12, thereby cleaning the air.

Alternately, the filter assembly 10 may be used with a filter mask. Filter masks are used to filter airborne contaminates from the air. The filter assembly 10 may be used with a filter mask to provide a filter mask with easily removable filters. Accordingly, the filter media 30 within the filter mask may be removed and/or replaced depending on the desired use and lifespan of the filter media 30. The filter assembly may be used to filter air entering the mask and/or air exiting the mask.

While the above description describes features of example embodiments, it will be appreciated that some features and/or functions of the described embodiments are susceptible to modification without departing from the spirit and principles of operation of the described embodiments. For example, the various characteristics, which are described by means of the represented embodiments or examples, may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A filter assembly having a lateral width, a longitudinal length and a vertical height, the first assembly comprising first and second inter-engageable housings wherein:
   (a) the first housing having first and second laterally extending opposed end walls and first and second longitudinally extending opposed sidewalls, each of the first and second opposed sidewalls extending between the first and second opposed end walls, each of the first and second opposed end walls having an inner side, an outer side, and a plurality of recesses provided therein;
   (b) the second housing having first and second laterally extending opposed end walls and first and second longitudinally extending opposed sidewalls, each of the first and second opposed sidewalls extending between the first and second opposed end walls and having a vertical height that is shorter than a vertical height of the first and second opposed end walls, each of the first and second opposed end walls having a plurality of ribs provided on an inner surface thereof, the ribs having a vertical height wherein, when the first and second housings are in an engaged configuration, the ribs are receivable in the recesses of the end walls of the first housing, the first opposed sidewall of the second housing abuts the first opposed sidewall of the first housing, the second opposed sidewall of the second housing abuts the second opposed sidewall of the first housing and a plane that is transverse to the vertical height of the filter assembly extends through the first and second opposed end walls of the second housing and the first and second sidewalls of the first housing;
   (c) a filter media wherein, when the first and second housings are in an engaged configuration, a portion of the filter media is positioned between the ribs and the recesses of the end walls of the first housing, another portion of the filter media is positioned between the first opposed sidewall of the second housing and the first opposed sidewall of the first housing and another portion of the filter media is positioned between the second opposed sidewall of the second housing and the second opposed sidewall of the first housing.

2. The filter assembly of claim 1 wherein the first and second housings are lockingly engaged when the first and second housings are in an engaged configuration.

3. The filter assembly of claim 2 wherein the first and second housings are lockingly secured together by a friction fit.

4. The filter assembly of claim 1 wherein the first and second housings are removeably secured together.

5. The filter assembly of claim 1 wherein one of the first and second housings is made of a deformable sealing material.

6. The filter assembly of claim 5 wherein the second housing is made of an elastomeric material.

7. The filter assembly of claim 1 wherein one of the surfaces of one of the first and second housings that abut surfaces of the other of the first and second housings is provided with a deformable sealing material.

8. The filter assembly of claim 1 wherein the filter assembly defines first and second side by side chambers.

9. The filter assembly of claim 8 wherein air flows in a first direction through the first chamber and air flows in a second direction that is opposed to the first direction through the second chamber.

10. The filter assembly of claim 8 wherein the filter media in the first chamber comprises a pre-motor filter and the filter media in the second chamber comprises a post motor filter.

11. The filter assembly of claim 8 wherein the filter media that extends between the first and second opposed end walls of the first housing comprises a contiguous filter member that is located in each of the first and second chambers.

12. The filter assembly of claim 8 wherein, when the filter media is positioned between the first and second housings and the first and second housings are in an engaged configuration, the filter media has a laterally extending filter media profile, and the second housing further comprises an intermediate wall located between the first and second end walls and the intermediate wall has a support surface that has a laterally extending profile that is comparable to that of the filter media profile.

13. The filter assembly of claim 12 wherein the filter media profile is a corrugated profile.

14. A filter assembly comprising first and second inter-engageable housings wherein:
   (a) the first housing having first and second laterally extending opposed end walls and first and second longitudinally extending opposed sidewalls, each of the first and second opposed sidewalls extending between the first and second opposed end walls, each of the first and second opposed ends wall a plurality of recesses provided therein;
   (b) the second housing having first and second laterally extending opposed end walls and first and second longitudinally extending opposed sidewalls, each of the first and second opposed sidewalls extending between the first and second opposed end walls, each of the first and second opposed end walls having a plurality of ribs provided on an inner surface thereof wherein, when the first and second housings are in an engaged configuration, the ribs are receivable in the recesses of the end walls of the first housing, the first opposed sidewall of the second housing abuts the first opposed sidewall of the first housing and the second opposed sidewall of the second housing abuts the second opposed sidewall of the first housing;

(c) a filter media wherein, when the first and second housings are in an engaged configuration, a portion of the filter media is positioned between the ribs and the recesses of the end walls of the first housing, another portion of the filter media is positioned between the first opposed sidewall of the second housing and the first opposed sidewall of the first housing and another portion of the filter media is positioned between the second opposed sidewall of the second housing and the second opposed sidewall of the first housing wherein one of the first and second housings is made of a deformable sealing material.

15. A filter assembly comprising first and second inter-engageable housings wherein:
   (a) the first housing having first and second laterally extending opposed end walls and first and second longitudinally extending opposed sidewalls, each of the first and second opposed sidewalls extending between the first and second opposed end walls, each of the first and second opposed ends wall a plurality of recesses provided therein;
   (b) the second housing having first and second laterally extending opposed end walls and first and second longitudinally extending opposed sidewalls, each of the first and second opposed sidewalls extending between the first and second opposed end walls, each of the first and second opposed end walls having a plurality of ribs provided on an inner surface thereof wherein, when the first and second housings are in an engaged configuration, the ribs are receivable in the recesses of the end walls of the first housing, the first opposed sidewall of the second housing abuts the first opposed sidewall of the first housing and the second opposed sidewall of the second housing abuts the second opposed sidewall of the first housing;
   (c) a filter media wherein, when the first and second housings are in an engaged configuration, a portion of the filter media is positioned between the ribs and the recesses of the end walls of the first housing, another portion of the filter media is positioned between the first opposed sidewall of the second housing and the first opposed sidewall of the first housing and another portion of the filter media is positioned between the second opposed sidewall of the second housing and the second opposed sidewall of the first housing wherein one of the surfaces of one of the first and second housings that abut surfaces of the other of the first and second housings is provided with a deformable sealing material.

\* \* \* \* \*